(12) United States Patent
Tanner et al.

(10) Patent No.: US 9,073,618 B2
(45) Date of Patent: Jul. 7, 2015

(54) COMPOSITE ACCESS DOOR

(71) Applicant: The Boeing Company, Chicago, IL (US)

(72) Inventors: Richard B. Tanner, Seattle, WA (US); Brian H. Korenaga, Shoreline, WA (US); Jeffrey F. Stulc, Stanwood, WA (US); Ian C. Burford, Duvall, WA (US)

(73) Assignee: The Boeing Company, Chicago, IL (US)

(*) Notice: Subject to any disclaimer, the term of this patent is extended or adjusted under 35 U.S.C. 154(b) by 159 days.

(21) Appl. No.: 13/875,548

(22) Filed: May 2, 2013

(65) Prior Publication Data

US 2013/0232883 A1  Sep. 12, 2013

Related U.S. Application Data

(63) Continuation of application No. 12/606,331, filed on Oct. 27, 2009, now Pat. No. 8,443,575.

(51) Int. Cl.
  *B64C 1/14* (2006.01)
  *E04C 2/54* (2006.01)
  *E05D 15/00* (2006.01)

(52) U.S. Cl.
  CPC .................. *B64C 1/1461* (2013.01); *E04C 2/54* (2013.01); *E05D 15/00* (2013.01); *B64C 1/1446* (2013.01)

(58) Field of Classification Search
  CPC ...... B64C 1/1461; B64C 1/1407; B64C 1/14; B64C 1/12
  See application file for complete search history.

(56) References Cited

U.S. PATENT DOCUMENTS

| | | |
|---|---|---|
| 2,576,734 A | 11/1951 | Voelker |
| 2,597,682 A | 5/1952 | Snow |
| 2,742,247 A | 4/1956 | Victor |
| 4,291,816 A | 9/1981 | Lamoureux |
| 4,352,142 A | 9/1982 | Olson |
| 4,530,443 A | 7/1985 | Gorges |
| 4,579,248 A | 4/1986 | Gorges |
| 5,316,167 A | 5/1994 | Kay |
| 5,544,449 A | 8/1996 | Amelio et al. |
| 6,557,338 B2 | 5/2003 | Holme et al. |
| 7,576,966 B2 | 8/2009 | Heeter |
| 7,985,826 B2 | 7/2011 | Nava et al. |
| 7,988,094 B2 | 8/2011 | Ostrem et al. |
| 8,016,235 B2 | 9/2011 | Ramirez Blanco |
| 8,141,820 B2 | 3/2012 | Zuniga Sagredo |
| 2007/0207421 A1 | 9/2007 | Heeter |
| 2008/0154002 A1 | 6/2008 | Nava et al. |

(Continued)

OTHER PUBLICATIONS

Tanner et al., "Composite Access Door," U.S. Appl. No. 12/606,331, filed Oct. 27, 2009, 43 pages.

(Continued)

*Primary Examiner* — Philip J Bonzell
(74) *Attorney, Agent, or Firm* — Yee & Associates, P.C.

(57) ABSTRACT

A method of installing a door in an access opening in a skin of an aircraft. A composite inner door panel is positioned against an inside face of the skin. A composite outer door panel is positioned against an outside face of the skin. A plurality of fasteners is installed through fastener openings in the composite outer door panel. The plurality of fasteners is tightened to form a chamfered interface between the skin and the composite outer door panel.

12 Claims, 9 Drawing Sheets

(56) References Cited

U.S. PATENT DOCUMENTS

| | | |
|---|---|---|
| 2008/0169381 A1* | 7/2008 | Ostrem et al. ............ 244/129.3 |
| 2009/0166473 A1 | 7/2009 | Zuniga Sagredo |
| 2009/0294591 A1* | 12/2009 | Ramirez Blanco et al. ......................... 244/129.4 |

OTHER PUBLICATIONS

Johnson et al., "Design of Composite Wing Access Cover Under Impact Loads," Applied Composite Materials, vol. 7, No. 4, Jul. 2000, pp. 219-229.

Office Action, dated Apr. 24, 2012, regarding U.S. Appl. No. 12/606,331, 10 pages.

Final Office Action, dated Sep. 6, 2012, regarding U.S. Appl. No. 12/606,331, 9 pages.

Notice of Allowance, dated Nov. 19, 2012, regarding U.S. Appl. No. 12/606,331, 7 pages.

Notice of Allowance, dated Jan. 9, 2013, regarding U.S. Appl. No. 12/606,331, 11 pages.

* cited by examiner

COMPOSITE ACCESS DOOR

CROSS REFERENCE TO RELATED APPLICATIONS

This application is a continuation application of and claims the benefit of U.S. patent application Ser. No. 12/606,331, filed Oct. 27, 2009, status allowed.

TECHNICAL FIELD

This disclosure generally relates to closures such as doors, and deals more particularly with an impact resistant composite access door, especially for aircraft.

BACKGROUND

Access doors are sometimes provided in the aircraft skins to allow service personnel access to various internal systems. For example, access doors may be provided on the underside of aircraft wings in order to permit access to internal wing fuel tanks. Some of these access doors must be designed to withstand impact loads from debris while retaining a fluid tight seal to prevent the escape of fuel following an impact. In the case of aircraft wing skins formed of metal, these access doors may also be made of metal and may require high impact resistance.

The use of composite skins in some newer aircraft present challenges in designing suitable access doors, particularly for wing mounted fuel tanks. Metal access doors can add undesirable weight to the aircraft and may present material incompatibilities when used with certain composite skins, such as carbon fiber reinforced plastic (CFRP) laminates. Other design challenges include the need to meet requirements for electrostatic performance, lightning strike and impact resistance. In addition, the access doors must include fuel tight seals that prevent fuel leakage over the aircraft's expected service life.

Accordingly, there is a need for an access door for composite aircraft structures such as CFRP laminate wing skins which is lightweight, line replaceable and meets a variety of performance specifications required by aircraft regulating authorities.

SUMMARY

In an illustrative embodiment, a method of installing a door in an access opening in a skin of an aircraft is provided. A composite inner door panel is positioned against an inside face of the skin. A composite outer door panel is positioned against an outside face of the skin. A plurality of fasteners is installed through fastener openings in the composite outer door panel. The plurality of fasteners is tightened to form a chamfered interface between the skin and the composite outer door panel.

The disclosed embodiments satisfy the need for an improved access door for aircraft fuel tanks and the like which overcomes limitations of existing access doors, and is suitable for use with composite aircraft skins.

BRIEF DESCRIPTION OF THE ILLUSTRATIONS

DETAILED DESCRIPTION

Figure 1:
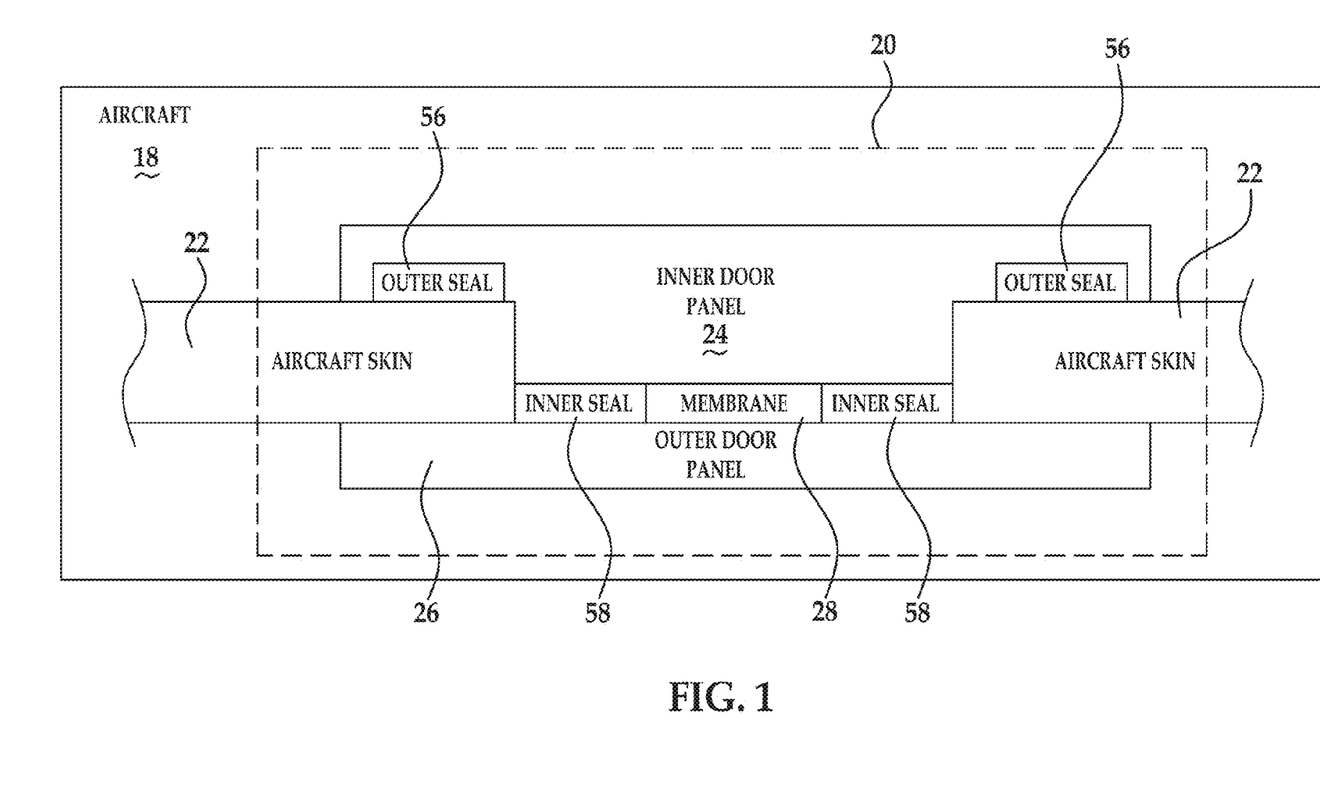
FIG. 1 is a functional block diagram of an access door mounted on a skin of an aircraft.

Referring first to FIG. 1, the disclosed embodiments generally relate to a composite access door 20 mounted on the skin 22 of an aircraft 18. The skin 22 may comprise, for example, and without limitation, a composite wing skin formed of a CFRP laminate. The access door 20 broadly comprises an inner door panel 24 having a membrane 28, and an outer door panel 26. The skin 22 of the aircraft 18 is clamped between the inner and outer door panels 24, 26, respectively. The inner door panel 24 is sealed to the outer door panel 26 by an inner seal 58, while the inner door panel 24 is sealed to the skin 22 by an outer seal 56.

Referring now to FIGS. 2-6, the access door 20 is mounted within an opening 25 (FIGS. 2 and 3) in an outer skin 22 of an aircraft 18 (FIG. 1). The skin 22 may form part of a wing (not shown) containing an internal fuel tank (not shown) which is accessed through the opening 25. The skin 22 may comprise, for example and without limitation, a composite material formed from laminated plies of CFRP. In the case of an internal wing fuel tank, the access opening 25 may be located on the underside of the wing where the access door 20 may be subject to impact from a variety of foreign objects and debris (FOD) sometimes encountered in normal operating environments, such as during takeoffs and landings. Various embodiments of the access door 20 may be employed at differing locations on the wings or at locations on the aircraft 18 other than on wings. The disclosed access door 20 is lightweight, due in part to the fact that the inner door panel 24 comprises a relatively thin membrane 28, yet may meet a variety of regulatory specifications as a result of its design features, including the impact resistance of the outer door panel 26.

Figure 2:
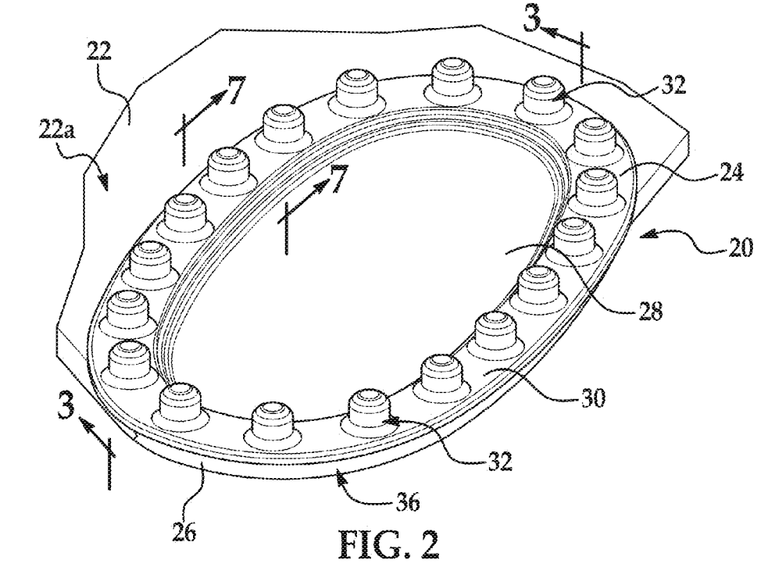
FIG. 2 is an illustration of an interior isometric view of an access door mounted in an aircraft skin.

The illustrated access door 20 is generally elliptical in shape, however other shapes may be possible, depending upon the application. The access door 20 broadly comprises an inner door panel 24, and an outer door panel 26. As will be discussed in more detail, and as shown in FIG. 2, the wing skin 22 is clamped between the outer peripheries 27a, 27b of the door panels 24, 26, respectively.

The inner door panel 24 comprises an elliptically shaped outer flange 30 at the periphery 27a of the inner panel 24 which overlies an inside face 22a of the skin 22. The flange 30 includes a plurality of integrally formed, spaced apart fastener bosses 32 which are axially aligned with fastener openings 34 in the outer door panel 26. The inner door panel 24 further includes a membrane 28 which covers the access opening 25 and may be integrally formed with the outer flange 30. The inner door panel 24 may be formed of suitable composite materials, but is relatively thin at the center membrane which is essentially non-structural, i.e. it is not intended to carry any significant structural loads. In one embodiment, the inner door panel 24 may be formed with a combination of nylon resin and carbon fibers wherein the content of the carbon fibers is approximately 30% by weight. The inner door panel 24 may be coated with a layer (not shown) of antistatic material.

Figure 3:
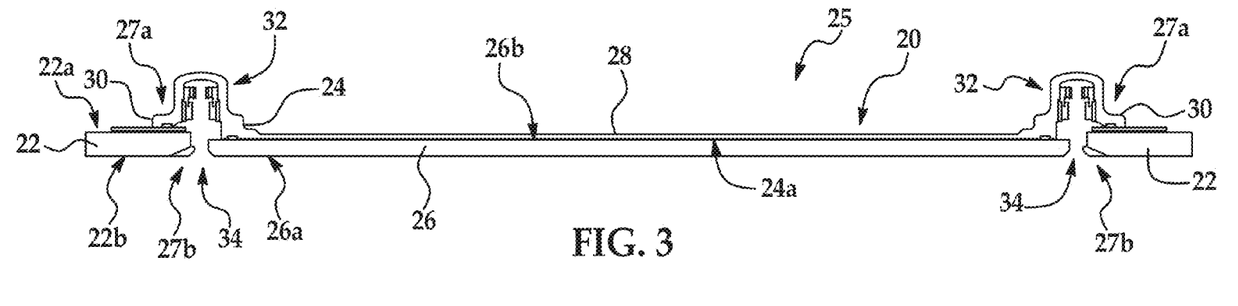
FIG. 3 is an illustration of a sectional view taken along the line 3-3 in FIG. 2.
Figure 4:
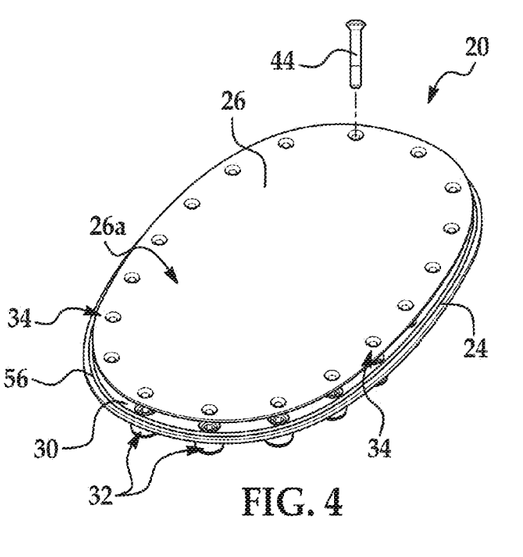
FIG. 4 is an illustration of an exterior isometric view of the access door.
Figure 5:
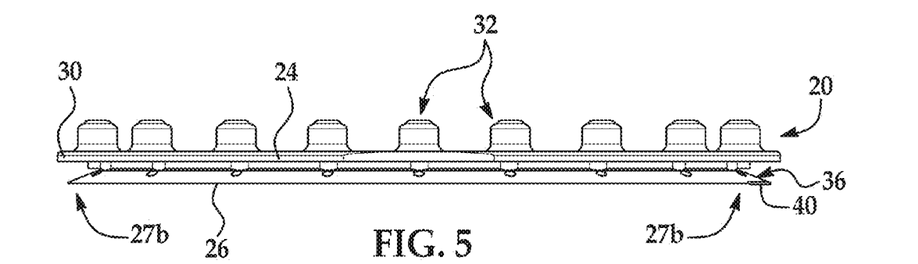
FIG. 5 is an illustration of a side view of the access door shown in FIGS. 2-4.
Figure 6:
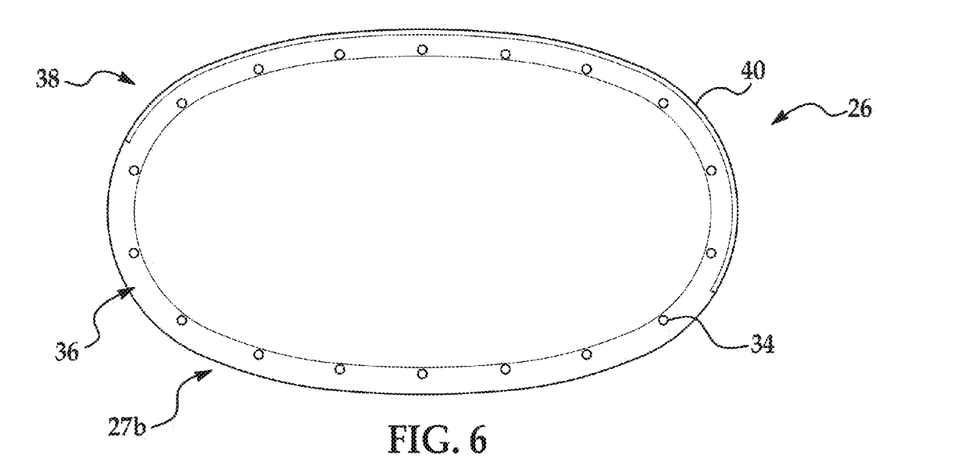
FIG. 6 is an illustration of a plan view of the interior side of the outer door panel forming part of the access door shown in FIGS. 2-4.

The outer door panel 26 is elliptically shaped and engages the inner door panel 24 in essentially face-to-face contact. The outer panel 26 may be formed of composite materials, such as, without limitation, laminated plies of CFRP in the form of tape and/or fabric. The outer door panel 26 includes a chamfer 36 (see FIGS. 5 and 6) around its entire outer periphery 27b. As best seen in FIG. 6, the outer panel 26 includes a leading edge 38 which is covered by a protective metallic foil 40, such as, without limitation, titanium. As shown in FIGS. 3 and 4, the outer face 26a of the outer door panel 26 is essentially flat, however other shapes are possible, depending upon the contour of the surrounding skin 22. As previously mentioned, the outer panel 26 includes a plurality of countersink fastener holes 34 around its periphery which are axially aligned with the fastener bosses 32 in the inner panel 24. As will be discussed below, suitable fasteners 44 (FIG. 4) pass through the outer panel 26 into the bosses 32 of the inner panel 24 in order to draw the inner and outer panels 24, 26 respectively against the inner and outer faces 22a, 22b of the skin 22, thereby clamping the door 20 on the skin 22. The fasteners 44 also serve to draw the outer face 24a of inner door panel 24 and the inner face 26b of outer door panel 26 (FIG. 3) into contact around the periphery of the door interface, thereby providing an electrostatic bond path into the skin 22.

Figure 7:
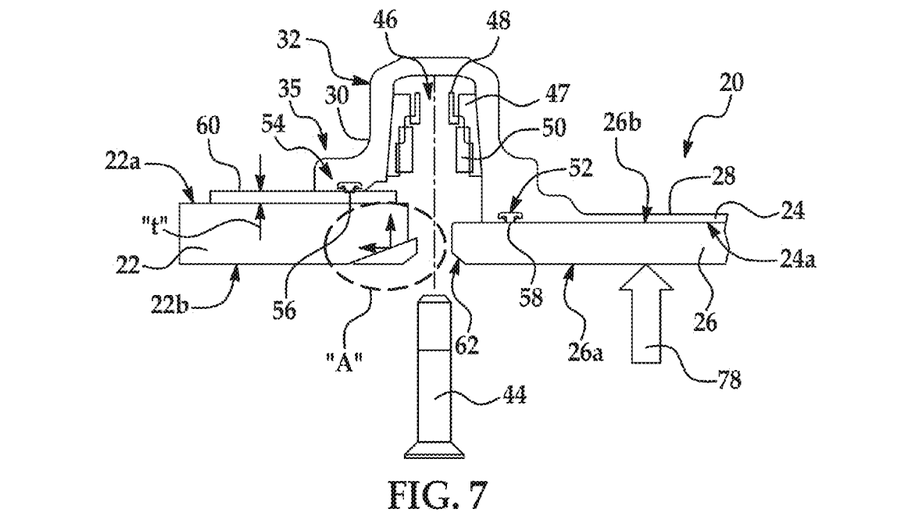
FIG. 7 is an illustration of a sectional view taken along the line 7-7 in FIG. 2.
Figure 8:
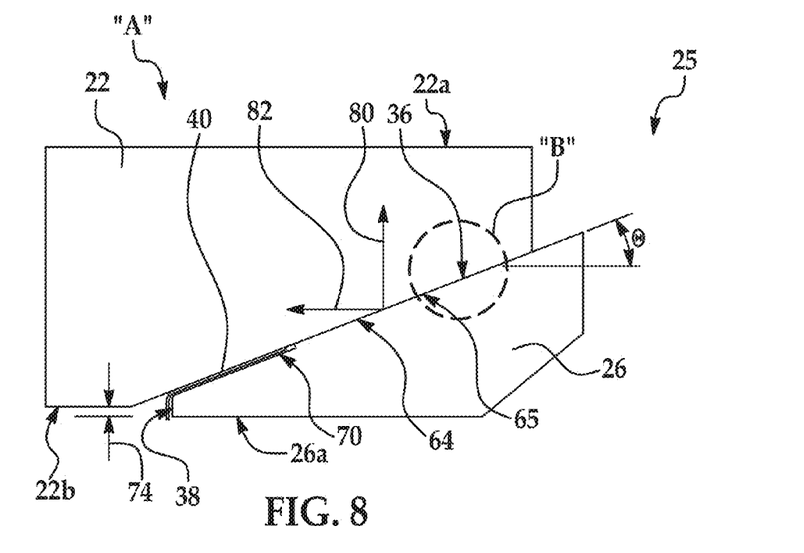
FIG. 8 is an illustration of the area designated as "A" in FIG. 7.

Attention is now directed to FIGS. 7 and 8 which illustrate additional edge details of the access door 20. As best seen in FIG. 7, the flange 30 of the inner panel 24 is provided with a pair of recesses 52, 54 extending around its entire periphery and which respectively contain a first, inner seal 58 and a second, outer seal 56. The inner seal 58 provides a fluid tight seal between the inner panel 24 and the outer panel 26 at the outer periphery of the membrane 28. The outer seal 56 provides a fluid tight seal between the outermost edge 35 of the inner panel 24 and the inner face 22a of the skin 22. In the illustrated example, seal 56 seals against a spacer 60 having a thickness "t" that is secured to the skin 22. The spacer 60 may be a carbon fiber/fiberglass laminate that is used to adjust for the difference in the thickness of the wing skin 22 to permit door commonality. In some applications, the spacer 60 may not be required, in which case the seal 56 directly engages the inside face 22a of the skin 22.

The inner panel membrane 28 may function as a cover or shield to prevent the undrained fuel or other materials from falling on service personnel when they remove the access door 20 during standard maintenance. Because of the relative thinness of the inner panel membrane 28, the membrane 28 may not be capable of resisting substantial loads such as those exerted by fuel inside the skin 22, and those resulting from impacts on the access door 20. Rather, the loads applied to the door 20 by fuel within the skin 22 and/or outside impacts are primarily carried by the outer door panel 26 whose thickness may be determined by ballistic resistance requirements of the particular application. The light weight inner door panel 24 may be designed so as to have less strength than the outer door panel 26, which may render it to be more subject to fracture compared to the outer door panel 26. In the event of a debris impact on the outer door panel 26, the outer door panel 26 may survive the impact with acceptable damage, but the displacement of the outer panel 26 caused by the impact may be sufficient to deflect the inner membrane 28 enough to cause it to fracture. In the event of such a fracture, fuel leakage may be prevented by the inner seal 58.

Installed within each of the fastener bosses 32 is fastener retention hardware 46 which may comprise an insert 47, a floating nut 48 and a nut retainer 50. The retention hardware 46 is adapted to retain one end of fastener 44 which releasably secures the door 20 on the skin 22. The insert 47 may be molded along with the inner panel 24, or may be installed in the bosses 32 after the panel 24 is fabricated. The retention hardware 46 may be a stainless steel or other metal that does not unfavorably react to carbon fiber used in the door panels 24, 26.

The outer face 22b of the skin 22 includes a chamfered edge 64 having a chamfer angle $\theta$ that matches (complements) that of the chamfer 36 on the outer door panel 26 so that the two chamfers 36, 64 complementally engage each other to form a chamfered interface 65 (FIG. 8) between the outer door panel 26 and the skin 22 when the access door 20 is installed in the opening 25. The chamfered interface 65 formed by the matching chamfers 36, 64 provide an improved load path that aids in dissipating kinetic energy generated by an impact load on the outer door panel 26. For example, as shown in FIG. 7, an impact force 78 acting on the outer face 26a of the outer panel 26 generates a load that is transmitted to the skin 22 through the chamfers 36, 64. The force 78 of the impact load is resolved into force components 80, 82 as shown in FIG. 8. One of the force components 80 is transmitted vertically, substantially normal to the plane of skin 22. The other force component 82 is transmitted laterally, substantially into the plane of the skin 22. The resolution of force 78 into components 80, 82 improves the impact resistance of the skin panel 22 by reducing interlaminar forces. The value of the chamfer angle $\theta$ may vary depending on the application. The improved load path resulting from the use of the matching chamfers 36, 64 may allow fewer and/or smaller fasteners 44 to be used to secure the door 20 on the skin 22. Additionally, the chamfers reduce the possibility that an impact 78 or similar force result in separation of the laminated plies (FIG. 8A) of the skin 22.

Figure 9:
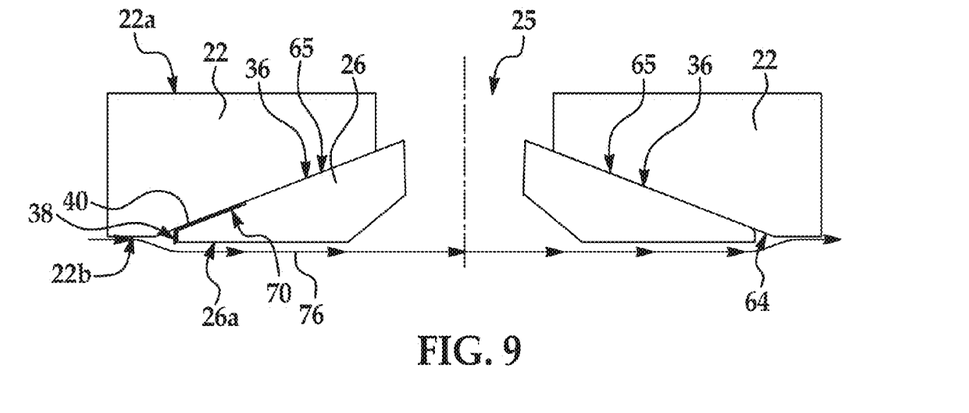
FIG. 9 is an illustration of a sectional view showing the deflection of an airstream flowing across the exterior surface of the access door and the skin.

As best seen in FIG. 8, the outer face 26a of the outer door panel 26 is spaced at a slight distance 74 from the outside face 22b of the skin 22. As a result of the spacing 74, the outer face 26a, including the leading edge 38 is located in the airstream (FIG. 9) flowing over the skin 22, causing the airstream 76 to be deflected away from the skin 22 in the area of the door 20. The deflection of the airstream 76 away from the outer face 22b of the skin 22 may prevent the airflow 76 from directly engaging the chamfer 64 on the skin 22 which otherwise could have an undesired effect on any exposed laminate areas of the skin 22 at the chamfer 64.

Referring to FIG. 8, the leading edge 38 of the outer panel 26 may include a shallow recess 70 containing a layer of metallic foil 40, such as, without limitation, titanium foil. The layer of metallic foil 40 may be replaceable and may protect the leading edge 38 of the outer panel 26 against erosion which may be caused by wind and/or rain flowing over the skin 22. In lieu of the layer of metallic foil 40, it may be possible to apply a metallic or other protective coating over the leading edge 38. This protective coating may also be replaceable.

Figure 8A:
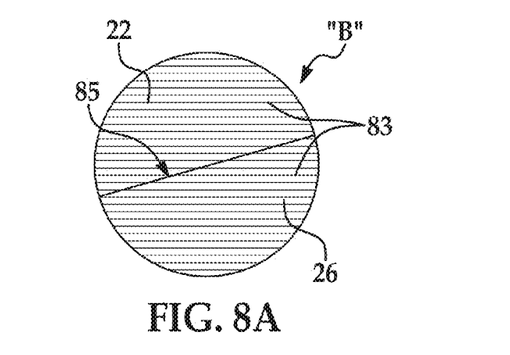
FIG. 8A is an illustration of the area designated as "B" in FIG. 8.

FIG. 8A illustrates a portion of the outer door panel-to-skin composite laminate interface 85 between the chamfers 36, 64 in FIG. 8. The ends of the carbon fibers 83 in the laminate door panel 26 and the laminate skin 22 are in substantially end-to-end contact at the interface 85. Because the carbon fibers 83 act as electrical conductors, the interface 85 forms a relatively good electrical connection between the door panel 26 and the skin 22, thereby electrically grounding the door 20 to the skin 22. The areal density of this electrical ground connection is increased by the chamfers 36, 64 which form a larger area of interface 85, compared to other possible interface geometries such as a simple butt joint or lap joint.

Figures 10, 11:
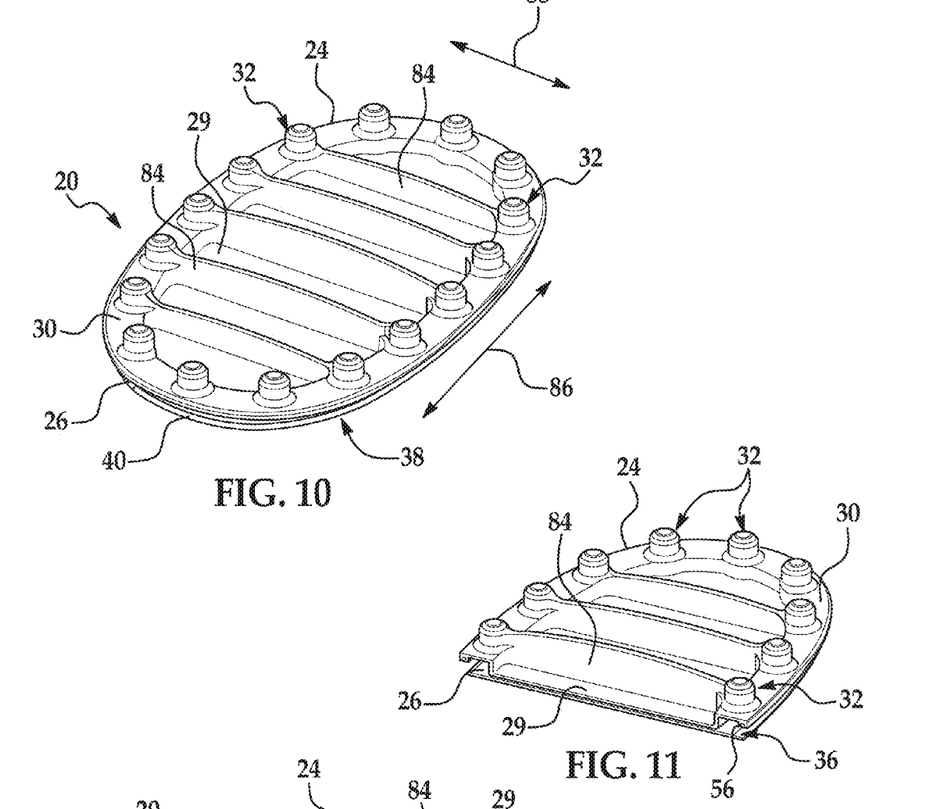
FIG. 10 is an illustration of an interior isometric view of an alternate form of the access door.
FIG. 11 is an illustration similar to FIG. 10 but showing the access door in section.

Attention is now directed to FIGS. 10 and 11 which illustrate an alternate form of the access door 20. In this embodiment, the inner door panel 24 includes a plurality of stiffener ribs 84 which are spaced apart in the span-wise direction 86 of the door 20 and only an outer seal 56. Depending on the shape of the door 20, the ribs 84 may extend in a direction other than the span-wise direction 86. The stiffener ribs 84 extend between opposing sets of the fastener bosses 32 and may be formed integral with the web 29 and outer flange 30.

Figure 12:
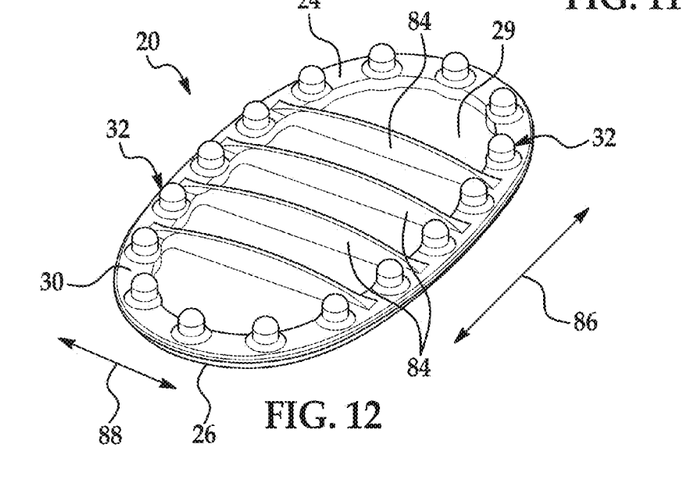
FIG. 12 is an illustration of an interior isometric view of another form of the access door.

FIG. 12 illustrates another form of the access door 20 wherein the stiffener ribs 84 extend in a chord-wise direction 88, are joined to the outer flange 30 and are spaced spanwise 86 between adjacent fastener bosses 32. The ribs 84 may extend in directions other than the chord-wise direction 88 to form any of various patterns, such as without limitation, a crossing pattern (not shown).

Figure 13:
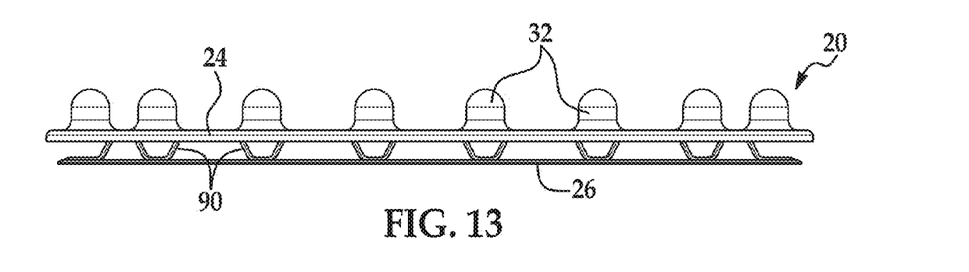
FIG. 13 is an illustration of a side view of another form of the access door.
Figure 14:
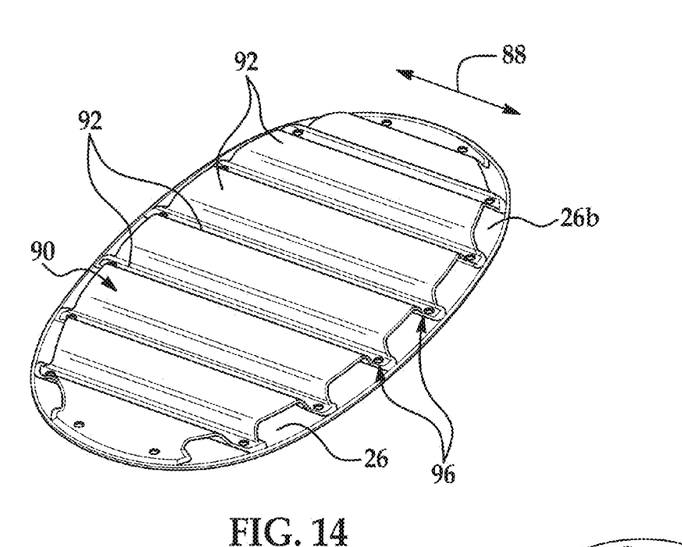
FIG. 14 is an illustration of an interior isometric view of the outer door panel shown in FIG. 13.
Figure 15:
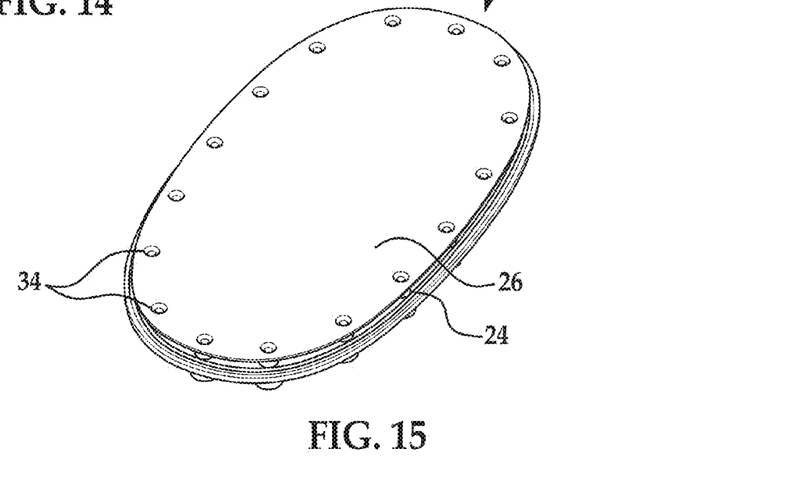
FIG. 15 is an illustration of an exterior isometric view of the access panel shown in FIG. 13.

Attention is now directed to FIGS. 13, 14 and 15 which illustrate an alternate form of the outer door panel 26 which includes a corrugated stiffener 90. The stiffener 90 includes alternating, substantially U-shaped corrugations 92 extending in the chord-wise direction 88. The corrugations 92 may form cross sectional shapes other than a U-shape, and may extend in directions other than the chord-wise direction 88. The corrugated stiffener 90 may be formed of composite materials, and may be either co-cured with or co-bonded to the inside face inner of the outer panel 26. The stiffener 90 includes through holes 96 to allow the fasteners 44 (FIG. 7) to pass therethrough. In this example, the inner door panel 24 engages the corrugations 92 of the stiffener 90, rather than the inside face inner of the outer door panel 26.

Figure 16:
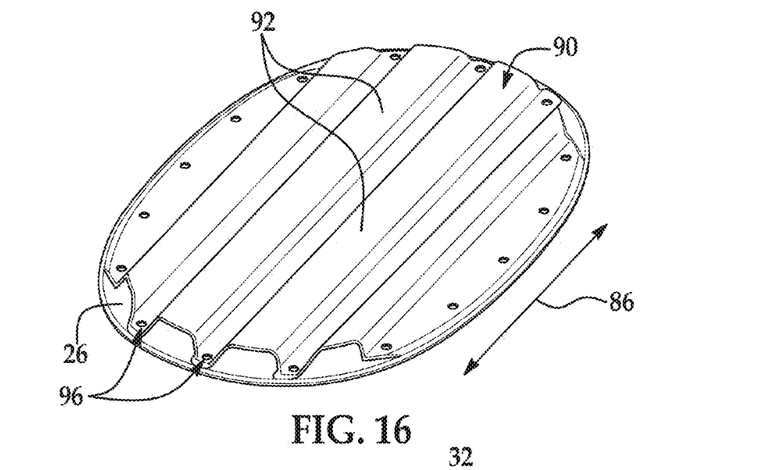
FIG. 16 is an illustration of an isometric view showing an alternate form of the stiffener attached to the outer door panel.

FIG. 16 illustrates an alternate form of the outer door panel 26 having a corrugated stiffener 90 attached thereto in which the corrugations 92 extend in the span-wise direction 86 of the panel 26. Although the corrugations 92 are shown as extending parallel to each other, other layout patterns, including a crossing pattern, are possible.

Figures 17, 18:
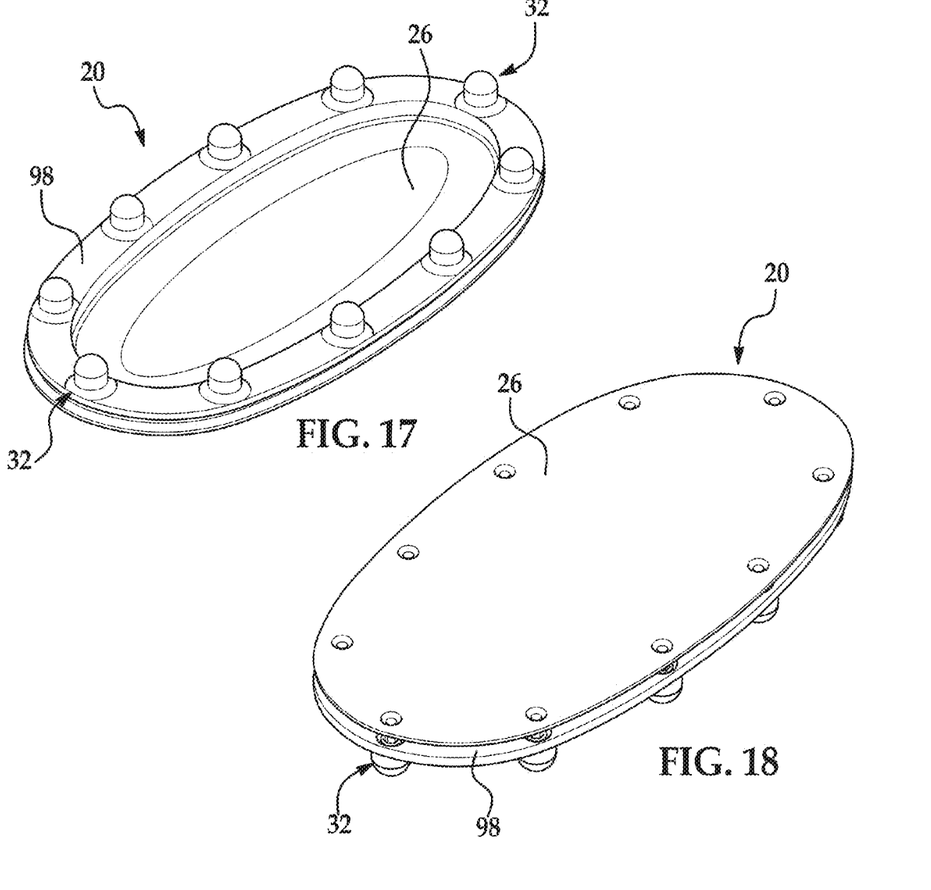
FIG. 17 is an illustration of an interior isometric view of another form of the access door.
FIG. 18 is an illustration similar to FIG. 17 but showing the exterior side of the access door.
Figure 19:
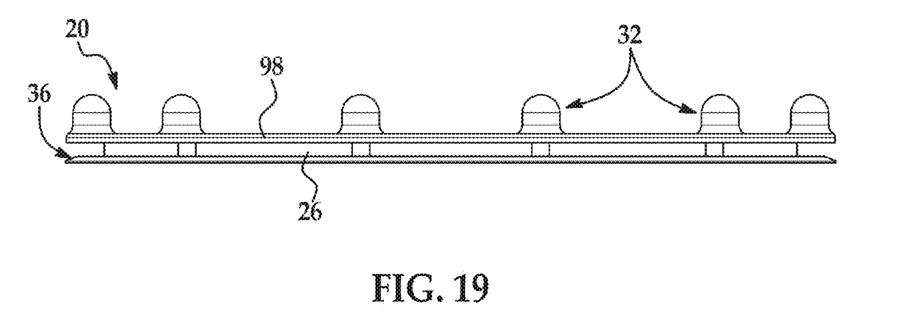
FIG. 19 is an illustration of a side view of the access door shown in FIGS. 17 and 18.

FIGS. 17, 18 and 19 illustrate a further embodiment of an access door 20 in which an elliptically shaped nut ring 98 having fastener bosses 32 is employed to releasably secure the outer door panel 26 on the skin 22 by means of fasteners (not shown). The nut ring 98 may be formed of composite materials and may be generally similar to the inner door panel 24 previously described, except that a membrane 28 or web 29 is not used and seals 56 and/or 58 may be omitted in non-fuel areas.

Figure 20:
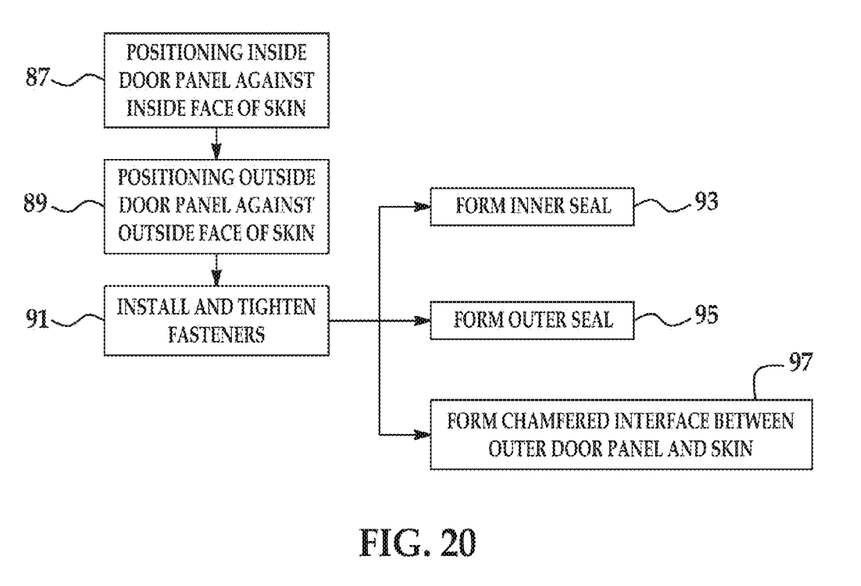
FIG. 20 is an illustration of a flow diagram of a method of installing a door in an access opening in an aircraft skin.

The various embodiments of the access door 20 described above may be installed in the access opening 25 (FIG. 3) by the method generally illustrated in FIG. 20. Beginning at step 87, the inner door panel 24 is positioned against the inside face 22a of the skin 22. Then at 89, the outer door panel 26 is positioned against the outside face 22b of the skin 22, such that the chamfers 36, 64 (FIG. 8) face each other to form interface 65 and the fastener openings 34 are axially aligned with the fastener bosses 32 in the inner door panel 24. The fasteners 44 (FIG. 7) are installed in the door 20 within countersinks 62 (FIG. 7) and tightened at step 91. Tightening the fasteners 44 draws the inner and outer door panels 24, 26 respectively, toward each other, thereby clamping the skin 22 between the panels 24, 26. As the fasteners 44 are tightened, the inner seal 58 is drawn against the inner face 26b of outer door panel 26 to form an inner seal at 93, and the outer seal 56 is drawn against the inner face 22a (or against the spacer 60) of the skin 22 to form the outer seal at 95. Tightening the fasteners at 91 also draws the chamfers 36, 64 against each other to form the chamfered interface 65, as shown at 97.

Figure 21:
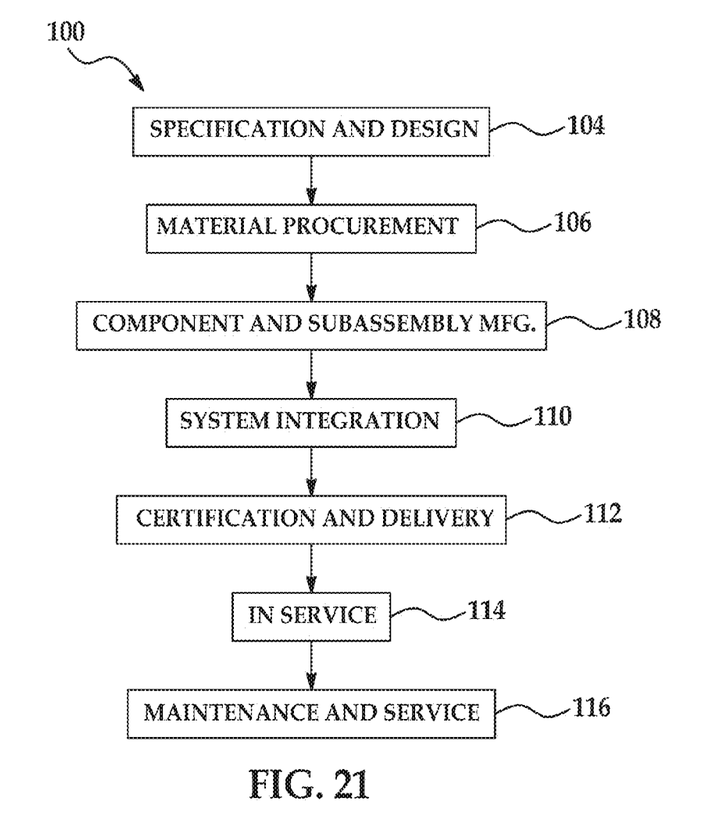
FIG. 21 is an illustration of a flow diagram of aircraft production and service methodology.
Figure 22:
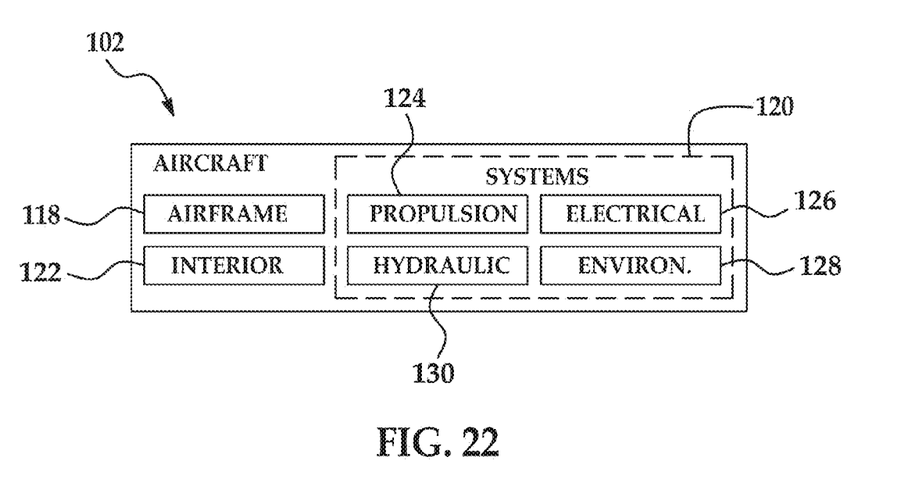
FIG. 22 is an illustration of a block diagram of an aircraft.

Embodiments of the disclosure may find use in a variety of potential applications, particularly in the transportation industry, including for example, aerospace, marine and automotive applications. Thus, referring now to FIGS. 21 and 22, embodiments of the disclosure may be used in the context of an aircraft manufacturing and service method 100 as shown in FIG. 21 and an aircraft 102 as shown in FIG. 22. During pre-production, exemplary method 100 may include specification and design 104 of the aircraft 102 and material procurement 106 in which the disclosed access door 20 may be specified for use in the aircraft 102. During production, component and subassembly manufacturing 108 and system integration 110 of the aircraft 102 takes place. The disclosed embodiments may be used to install an access door 20 which may form part of the components and subassemblies. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on). The disclosed access door 20 may be used to replace an existing access door during the maintenance and service 116.

Each of the processes of method 100 may be performed or carried out by a system integrator, a third party, and/or an operator (e.g., a customer). For the purposes of this description, a system integrator may include without limitation any number of aircraft manufacturers and major system subcontractors; a third party may include without limitation any number of vendors, subcontractors, and suppliers; and an operator may be an airline, leasing company, military entity, service organization, and so on.

As shown in FIG. 22, the aircraft 102 produced by exemplary method 100 may include an airframe 118 with a plurality of systems 120 and an interior 122. The disclosed access door 20 may be installed in a skin forming part of the airframe 118. Examples of high-level systems 120 include one or more of a propulsion system 124, an electrical system 126, a hydraulic system 130, and an environmental system 128. Any number of other systems may be included. Although an aerospace example is shown, the principles of the disclosure may be applied to other industries, such as the marine, heavy equipment, power generation, refinery, and automotive industries.

The disclosed embodiments may be installed on the aircraft 102 during any one or more of the stages of the production and service method 100. For example, the disclosed access door 20 may be installed on the aircraft 102 during the production process 110. Similarly, the disclosed access door may be installed on the aircraft 102 while the aircraft 102 is in service 114.

According to the disclosed embodiments, a lightweight, impact resistant composite access door is provided for use in composite wing skins for aircraft to allow access to fuel tanks and other internal volumes within a wing. The access door may meet regulatory requirements for electromagnetic performance and impact resistance. The access door is suitable for use with CFRP wing skins, and is simple in design, allowing quick and easy replacement by line mechanics. The door employs a double, fluid tight seal that may reduce the possibility of fuel leaks resulting from impacts by debris. The construction of the door may result in the need for fewer and/or smaller fasteners to clamp the door to the wing skin.

According to one disclosed embodiment, an access door is provided for an opening in an aircraft skin. The access door comprises composite inner and outer door panels. The door also includes a first fluid seal between the inner door panel and the skin, and a second fluid seal between the inner and outer door panels. The outer door panel includes a chamfered edge engaging a corresponding chamfered edge on the skin in order to transmit a portion of an impact load on the door laterally into the plane of the skin. The outer door panel may include an exterior surface spaced outwardly from the skin into an airstream passing over the skin so as to deflect the airstream away from the skin in the area of the door. The inner door panel may be nylon resin reinforced by approximately 30% by weight of carbon fibers.

According to another disclosed embodiment, an aircraft structure is provided having an outer skin with an access opening therein, and a fluid tight door covering the access opening. The skin includes a chamfered edge surrounding the access opening, and the door includes a corresponding chamfered outer edge complementally engaging the chamfered edge of the skin. Means are provided for releasably fastening the door on the skin. The door includes a leading edge covered in metallic foil and extending into the airstream passing over the skin.

According to a further disclosed embodiment, an impact resistant door is provided for accessing a fuel tank through an opening in a composite aircraft wing skin. The door includes an outer composite door panel and an inner composite door panel with a center membrane. The outer door panel functions to absorb impact from debris or the like and reacts the force applied to the door by pressurized fuel within the wing skin. The inner door panel has an outer periphery sealed against the inside surface of the wing skin. A seal is also provided between the outer door panel and the inner door panel around the outer periphery of the center membrane to prevent the escape of fuel through the door in the event of a leak in the inner door membrane.

According to another disclosed embodiment, an aircraft structure comprises a carbon fiber composite laminate outer skin having an access opening therein allowing access to the interior of the structure. The skin includes a chamfered edge surrounding the access opening that exposes ends of carbon fibers in the laminate skin. A carbon fiber composite laminate access door covers the access opening and includes a chamfered outer edge exposing ends of carbon fibers in the laminate door. The chamfered edges of the skin and the door panel complementally engage each other. The carbon fibers of the skin and the door are substantially in end-to-end contact forming an electrical ground connection between the door panel and the skin. Means are provided for releasably fastening the door panel on the skin.

In accordance with still another embodiment, a method is provided for installing a door in an access opening in the skin of an aircraft. The method includes positioning an inner door panel against an inside face of the skin, and positioning an outer door panel against an outside face of the skin. An inner seal is formed between the inner door panel and the outer door panel, and an outer seal is formed between the inner door panel and the inside face of the skin.

In one illustrative embodiment, an access door for an opening in an aircraft skin comprises a composite inner door panel, a composite outer door panel, a first fluid seal between the inner door panel and the skin, and a second fluid seal between the inner door panel and the outer door panel. In one illustrative example, the access door further comprises a means for releasably fastening the inner and outer door panels on the skin, the fastening means including fasteners passing through the outer door panel and attaching to the inner door panel. In another illustrative example, the outer door panel includes a chamfered edge engaging the skin and transmitting a force component of an impact load on the door essentially into the plane of the skin. In another illustrative example, the outer door panel includes an exterior surface spaced outwardly from the skin into an airstream passing over the skin so as to deflect the airstream away from the skin in the area of the door. In another illustrative example, the inner door panel includes nylon resin and carbon fibers. In another illustrative example, the inner door panel includes nylon resin and carbon fibers, wherein the inner door panel includes approximately 30% by weight of the carbon fibers. In another illustrative example, the inner door panel has less strength than the outer door panel and is designed to allow fracture upon an impact to the outer door panel.

In a further illustrative embodiment, an aircraft structure comprises an outer skin having an access opening therein allowing access to the interior of the structure, the skin including a chamfered edge surrounding the access opening; a fluid-tight door covering the access opening, the door including a chamfered outer edge complementally engaging the chamfered edge of the skin; and a means for releasably fastening the door on the skin. In one illustrative example, the door includes an exterior surface spaced outwardly from the skin into an airstream passing over the skin so as to deflect the airstream away from the chamfered edge of the skin. In another illustrative example, the door includes a leading edge covered in metallic foil and extending into an airstream passing over the skin. In another illustrative example, each of the outer door panel and the skin is a composite laminate. In another illustrative example, the door includes an impact resistant outer door panel formed of composite materials and having the chamfered outer edge defined thereon, an inner door panel formed of composite materials and in face-to-face contact with the outer door panel, and at least a first seal for sealing the outer door panel to the skin around the periphery of the door and preventing fluid leaks from the interior around the periphery of the door. In another illustrative example, the door includes an impact resistant outer door panel formed of composite materials and having the chamfered outer edge defined thereon, an inner door panel formed of composite materials and in face-to-face contact with the outer door panel, and at least a first seal for sealing the outer door panel to the skin around the periphery of the door and preventing fluid leaks from the interior around the periphery of the door, wherein the door includes a second seal between the inner door panel and the outer door panel for preventing fluid leaks from the interior of the structure through the door.

In a yet further illustrative embodiment, an impact resistant door for accessing a fuel tank through an opening in a composite aircraft wing skin comprises an outer composite door panel engaging an outside surface of the wing skin for absorbing an impact from debris or the like and reacting pressure against the door exerted by fuel within the wing skin; an inner composite door having a center membrane and an outer periphery sealed against an inside surface of the wing skin; and a seal between the outer door panel and the inner door panel around the outer periphery of the center membrane for preventing the escape of fuel through the door in the event of a leak in the membrane. In one illustrative example, the outer door panel includes a chamfered outer edge engaging the wing skin for transferring a force component of an impact load on the outer door panel laterally into the plane of the wing skin. In another illustrative example, the inner door panel includes approximately 30% by weight of the carbon fibers.

In a yet further illustrative embodiment, an aircraft structure comprises a carbon fiber composite laminate outer skin having an access opening therein allowing access to the interior of the structure, the skin including a chamfered edge surrounding the access opening and exposing ends of carbon fibers in the laminate skin; a carbon fiber composite access door covering the access opening, the door including a chamfered outer edge exposing ends of carbon fibers in the laminate outer door panel, the chamfered edges of the skin and the door panel complementally engaging each other with the carbon fibers of the skin and the door in substantially end-to-end contact forming an electrical ground connection between the door panel and the skin; and means for releasably fastening the door panel on the skin. In one illustrative example, the outer skin is a laminate and the exposed edge includes a chamfer, and the leading edge of the access door includes a chamfer engaging the chamfered edge of the wing skin. In another illustrative example, the aircraft structure further comprises an inner door membrane extending across the opening and covering the access door; a first fluid tight seal between the door and the skin; and a second fluid tight seal between the inner door panel and the outer door panel. In another illustrative example, the inner door panel includes approximately 30% by weight of carbon fibers.

In yet another illustrative embodiment, a method of installing a door in an access opening in the skin of an aircraft comprises positioning an inner door panel against an inside face of the skin; positioning an outer door panel against an outside face of the skin; forming an inner seal between the inner door panel and the outer door panel; and, forming an outer seal between the inner door panel and the inside face of the skin. In one illustrative example, the method further comprises forming a chamfered interface between the outer door panel and the skin which transfers a component of an impact load on the outer door panel laterally, substantially into the plane of the skin. In another illustrative example, the method further comprises protecting the chamfered skin from an airstream flowing over the skin by spacing an outer surface of the outer door panel outwardly from the outside face of the skin into an airstream flowing over the skin. In another illustrative example, the method further comprises protecting the chamfered skin from an airstream flowing over the skin by spacing an outer surface of the outer door panel outwardly from the outside face of the skin into an airstream flowing over the skin, and protecting a leading edge of the outer door panel from the airstream by applying a layer of metal over the leading edge.

In yet another illustrative embodiment an aircraft wing having an internal fuel tank comprises a composite outer wing skin including at least one fuel tank access opening therein, the skin including an inside face, and outside face having a chamfered edge surrounding the opening; and, an access door for allowing access to the fuel tank, the access door including—an impact resistant outer composite laminate door panel covering the access opening and overlying the outside face of the wing skin, the outer door panel including a chamfered edge complementally engaging the chamfered edge on the wing skin for transferring a component of an impact load on the outer door panel laterally into the plane of the wing skin, the outer door panel including an exterior surface spaced outwardly from the outer face of the wing skin into an airstream passing over the skin so as to deflect the airstream away from the chamfered edge of the skin, the outer door having a leading edge facing the airstream and covered with a layer of metal foil; an inner door panel covering the access opening and having an outer periphery overlying the inside face of the wing skin, the inner door including a plurality of integrally formed fastener bosses around the periphery thereof; a plurality of fasteners passing through the outer access door panel and into the fastener bosses for releasably fastening the access door on the wing skin; a first fluid tight seal between the outer periphery of the inner door panel and the inside face of the skin; and a second fluid tight seal between the inner door panel and the outer door panel.

A door for an aircraft wing fuel tank access opening includes an outer impact resistant composite door panel, and an inner composite door panel. Double seals on the inner door panel prevent fuel leakage, and a chamfered outer edge on the outer door panel transfers a component of impact loads laterally into the wing skin to increase kinetic energy absorption.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of installing a door in an access opening in a skin of an aircraft, comprising:
   positioning a composite inner door panel against an inside face of the skin;
   positioning a composite outer door panel against an outside face of the skin;
   installing a plurality of fasteners through fastener openings in the composite outer door panel;
   tightening the plurality of fasteners to form a chamfered interface between the skin and the composite outer door panel.

2. The method of claim 1, wherein tightening the plurality of fasteners draws the composite inner door panel and the composite outer door panel toward each other, thereby clamping the skin between the composite inner panel and the composite outer panel.

3. The method of claim 1, wherein the chamfered interface is configured to transfer a component of an impact load on the composite outer door panel laterally, substantially into the plane of the skin.

4. The method of claim 1, wherein tightening the plurality of fasteners forms an inner seal between an inner face of the composite outer door panel and an inner face of the composite inner door panel.

5. The method of claim 1, wherein tightening the plurality of fasteners forms an outer seal between an inner face of the composite inner door panel and the skin.

6. The method of claim 1, wherein positioning the composite outer door panel against an outside face of the skin comprises positioning the composite outer door panel such that a chamfer of the composite outer door panel faces a chamfer of the skin.

7. The method of claim 1, wherein positioning the composite outer door panel against an outside face of the skin comprises positioning the composite outer door panel such that the fastener openings in the composite outer door panel are axially aligned with fastener bosses in the composite inner door panel.

8. The method of claim 1, further comprising:
deflecting, using a leading edge of the composite outer door panel, an airstream away from the skin to prevent airflow from engaging the chamfer of the skin.

9. The method of claim 1, further comprising:
protecting a leading edge of the outer door panel from an airstream flowing over the skin by applying a layer of metal over the leading edge.

10. The method of claim 1, wherein tightening the plurality of fasteners to form the chamfered interface between the skin and the composite outer door panel forms an electrical connection between the composite outer door panel and the skin.

11. The method of claim 1, further comprising:
coating the composite inner door panel with a layer of antistatic material.

12. The method of claim 1, further comprising:
securing a spacer to the skin.

* * * * *